Patented May 13, 1924.

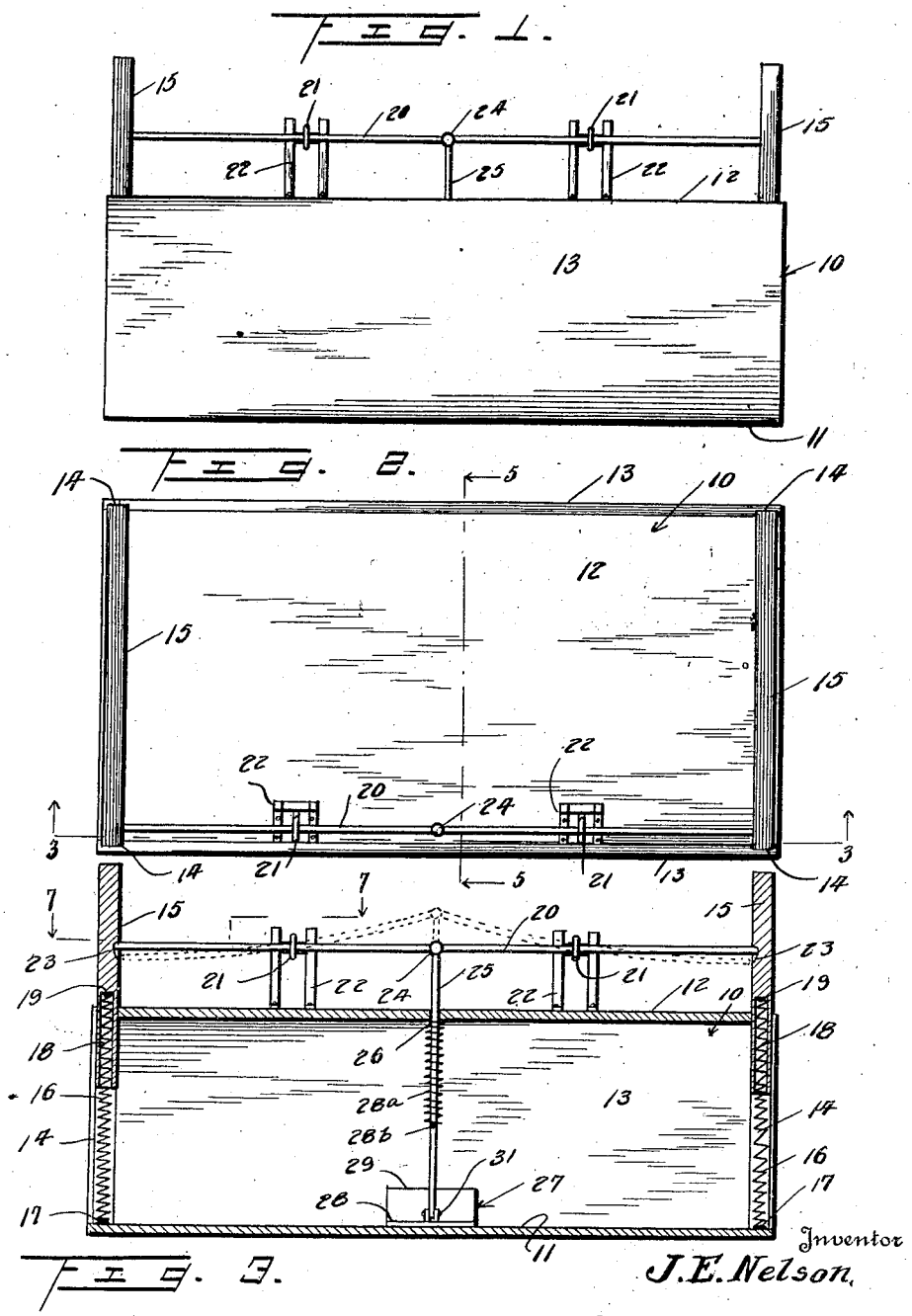

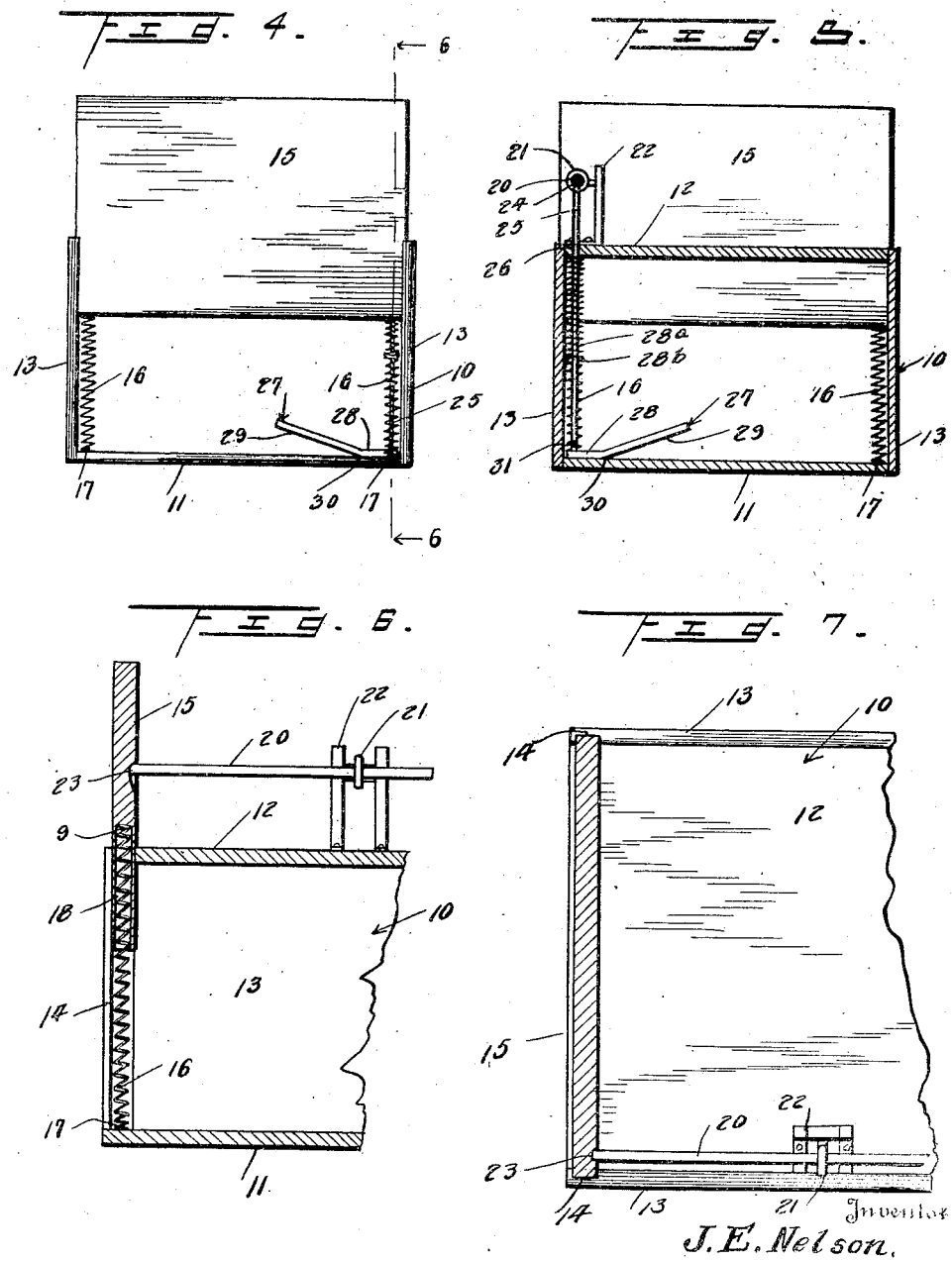

1,493,942

UNITED STATES PATENT OFFICE.

JACOB E. NELSON, OF LAKE PARK, MINNESOTA.

ANIMAL TRAP.

Application filed February 27, 1923. Serial No. 621,619.

*To all whom it may concern:*

Be it known that I, JACOB E. NELSON, a citizen of the United States, residing at Lake Park, in the county of Becker and State of Minnesota, have invented certain new and useful Improvements in Animal Traps; and I do hereby declare the following to be a full, clear, and exact description of the invention, such as will enable others skilled in the art to which it appertains to make and use the same.

This invention relates to an animal trap.

It is aimed to provide an improved construction primarily designed to catch without injury, small animals valuable for their fur and such as minks, weasels and skunks.

It is particularly aimed to provide a trap capable of simple, inexpensive and durable production from wood for the most part, using but few metal parts, to the end that minks in particular may be decoyed more readily than by means of a metal trap.

Another object is to provide a trap having the box or housing open at both ends, provided with novel means operable by engagement of an animal to simultaneously close each end in order to trap it, and with the trip means employed so disposed as to give the appearance to the animal of a substantially uninterrupted passageway through the box or housing.

Various additional objects and advantages will become apparent from a consideration of the description following taken in connection with the accompanying drawings illustrating an operative embodiment thereof.

In said drawings:—

Figure 1 is a view of the trap in front elevation;

Figure 2 is a plan view;

Figure 3 is a longitudinal sectional view on the line 3—3 of Figure 2, showing the open position of the doors and their fastening means in full lines and the released position of the fastening means in dotted lines;

Figure 4 is an end view;

Figure 5 is a transverse sectional view on the line 5—5 of Figure 2 particularly showing the trip mechanism;

Figure 6 is a sectional view on the line 6—6 of Figure 4 showing the mounting of one of the door-closing springs; and Figure 7 is a detail sectional view on the line 7—7 of Figure 3 illustrating the connection of the latch rod with one of the doors.

Like reference characters designate like or similar parts in the different views.

In reducing the invention to practice, a wooden or other box or housing is provided at 10 which may be rectangular as shown and closed except at both ends, and consisting of bottom, top and side walls 11, 12 and 13, respectively.

Slidable in grooves 14 provided vertically in the side walls 13, are doors or end closures 15, preferably of wood. Closing springs 16 are provided for the doors, one adjacent each side thereof. Each spring at its lower end is fastened as at 17 to the bottom wall 11. Said springs 16 also extend into recesses 18 provided vertically in the doors 15, and at 19, the upper ends of said springs 15 are fastened to the doors 15. When the doors are in their lowermost or closed position, said springs 16 are completely enclosed or housed in the recesses 18. When the doors are open, it will be realized that the springs 16 are disposed at opposite sides of the box 10 so as not to unduly obstruct the passageway therethrough. A latch rod 20 is disposed above the top wall 12 and loosely disposed in eyelets or bearings 21 of guide brackets 22 fastened to and rising from said walls 12. The ends of latch rod 20 are adapted to enter recesses or slots 23 provided in the inner surfaces of doors 15. Rod 20 is resilient and may be made of metal.

Rigidly fastened to rod 20 as by soldering at 24 is a depending trip rod 25, which may also be of metal, and which extends loosely through an opening 26 in top wall 12 to the end that rod 25 will be disposed relatively close to one of the side walls 13 so as to avoid undue obstruction of the passageway through box 10.

A trip plate 27 is disposed within box 10 substantially midway of the ends thereof and it may consist of a single metallic plate having a flat portion 28 and an upwardly deflected portion 29, providing a fulcruming edge 30 at their junction. Trip rod 25 is pivotally connected at 31 to the portion 28. An expansive coil spring 28ª surrounds trip rod 25 and abuts wall 12 and a pin 28ᵇ on said trip rod so as to normally maintain portion 28 in flat and intimate contact with the top of wall 12 and with the portion 29 upstanding. Said spring 28ᵃ is not of sufficient tension to seriously interfere with movement of the trip plate by the animal.

The set position of the trap is illustrated in full line particularly in Figure 3 where it will be noted that both doors 15 are held raised by latch rods 20, and due to the resiliency of said latch rods, the portion 28 is held in flat contact with wall 11 and with end 29 raised. The bait may be placed on the trip plate 27 or about it on wall 11 as preferred. Such bait will attract the animal which may enter through either end. Such animal in endeavoring to gain access to the bait or when eating it, is bound to engage the upstanding portion 29 and by its weight cause the plate 27 to fulcrum on the edge 30, causing the portion 28 to raise and accordingly raise the trip rod 25, sliding it through opening 26 and moving latch rod 20 upwardly at its center thereby causing contraction of said rod and movement of its ends out of the recesses 23. At the moment of disengagement of recesses 23 and latch rod 30, the springs 16 snap or quickly close the doors 15 to prevent escape of the captive.

Particular attention is called to the fact that the brackets 22 and eyelets 21 serve to equalize the movement of rod 20 from opposite ends so as to draw the same out of recesses 23 simultaneously, as is so important in the trapping of an animal where both ends of the trap are open.

In order to reset the trap or remove the captive, the doors 15 are individually adapted for elevation or opening. The upward movement of the doors will first move the rod 20 upwardly a slight distance to permit it to snap into the recess 23 thereof.

As the trap is primarily made of wood, it will effectively capture minks. Minks as a rule are hard to capture since traps are generally made of metal and they will not enter metal traps. The few parts of the present trap which are made of metal, do not affect the capture of minks as I have proved by actual use of the trap.

As merely one operative embodiment has been illustrated and described, it is to be understood that changes in the details may be resorted to provided they fall within the spirit and scope of the invention.

I claim as my invention:—

1. A trap having a passage way therethrough, a door therefor, trip means for the door, a closing spring for the door, said door having a recess therein, said recess closed at its sides and having a closed end, said spring engaging the closed end of said recess and adapted to be substantially completely received in the recess when the door is in closed position.

2. A trap having a box open at its ends and providing a passageway completely therethrough, vertically slidable doors for the opposite ends of the passageway, said doors adjacent their vertical sides having recesses, springs disposed in said recesses and connected to said doors and said box, said doors having second recesses, a resilient latch rod at its free end normally extending into the second recesses to maintain the doors in open position, a trip rod depending from said latch rod and into the box, guide brackets having eyelets through which said latch rod loosely passes and disposed equidistantly on opposite sides of the trip rod, said trip rod being disposed relatively close to one side of the box, a trip plate having a portion pivoted to said trip rod and normally maintained in flat contact with the bottom wall of the box, and said trip plate having an upwardly extending portion adapted for depression by an animal to fulcrum said plate at a point intermediate said portions.

In testimony whereof I affix my signature in presence of two witnesses.

JACOB E. NELSON.

Witnesses:
 CARL JLEHNE,
 JOHN THOMPSON.